United States Patent [19]

Suzuki

[11] Patent Number: 5,387,834
[45] Date of Patent: Feb. 7, 1995

[54] PIEZOELECTRIC ELEMENT DRIVING CIRCUIT

[75] Inventor: Masashi Suzuki, Nagoya, Japan

[73] Assignee: Brother Kogyo Kabushiki Kaisha, Nagoya, Japan

[21] Appl. No.: 194,870

[22] Filed: Jan. 28, 1994

Related U.S. Application Data

[63] Continuation of Ser. No. 959,441, Oct. 13, 1992, abandoned, which is a continuation-in-part of Ser. No. 728,592, Jul. 11, 1991, abandoned.

[30] Foreign Application Priority Data

Jul. 11, 1990 [JP] Japan .................. 2-186260
Oct. 11, 1991 [JP] Japan .................. 3-292397

[51] Int. Cl.⁶ ............................... H01L 41/09
[52] U.S. Cl. ............................. 310/317; 310/315; 310/346
[58] Field of Search ................... 310/315–317, 310/341, 346; 318/116

[56] References Cited

U.S. PATENT DOCUMENTS

| | | | |
|---|---|---|---|
| 4,866,326 | 9/1989 | Niikawa et al. | 310/315 |
| 5,037,217 | 8/1991 | Suzuki et al. | 310/315 |
| 5,053,668 | 10/1991 | Mitsuyasu | 310/317 |
| 5,095,256 | 3/1992 | Ueyama et al. | 318/116 |
| 5,190,383 | 3/1993 | Suzuki et al. | 400/124 |
| 5,214,340 | 5/1993 | Suzuki | 310/316 |

Primary Examiner—Thomas M. Dougherty
Attorney, Agent, or Firm—Oliff & Berridge

[57] ABSTRACT

To drive a piezoelectric element for use in a dot matrix printer for a period of time defined by $\pi\sqrt{LC}/2$, the fact that the electrostatic capacitance C of a piezoelectric element changes depending on the temperature thereof is considered. The piezoelectric element is supplied with a voltage from a D.C. power source when a switching transistor is being ON. A temperature sensor is provided which senses the temperature of the piezoelectric element. A microcomputer serving as a control circuit has a ROM in which ON durations Ton for the switching transistor are stored in relation to temperatures to be output from the temperature sensor. At the time of printing, a suitable ON duration corresponding to the sensed temperature is selected by the control circuit from the table so that the piezoelectric element is always displaced the same amount independently of the temperature of the piezoelectric element.

20 Claims, 4 Drawing Sheets

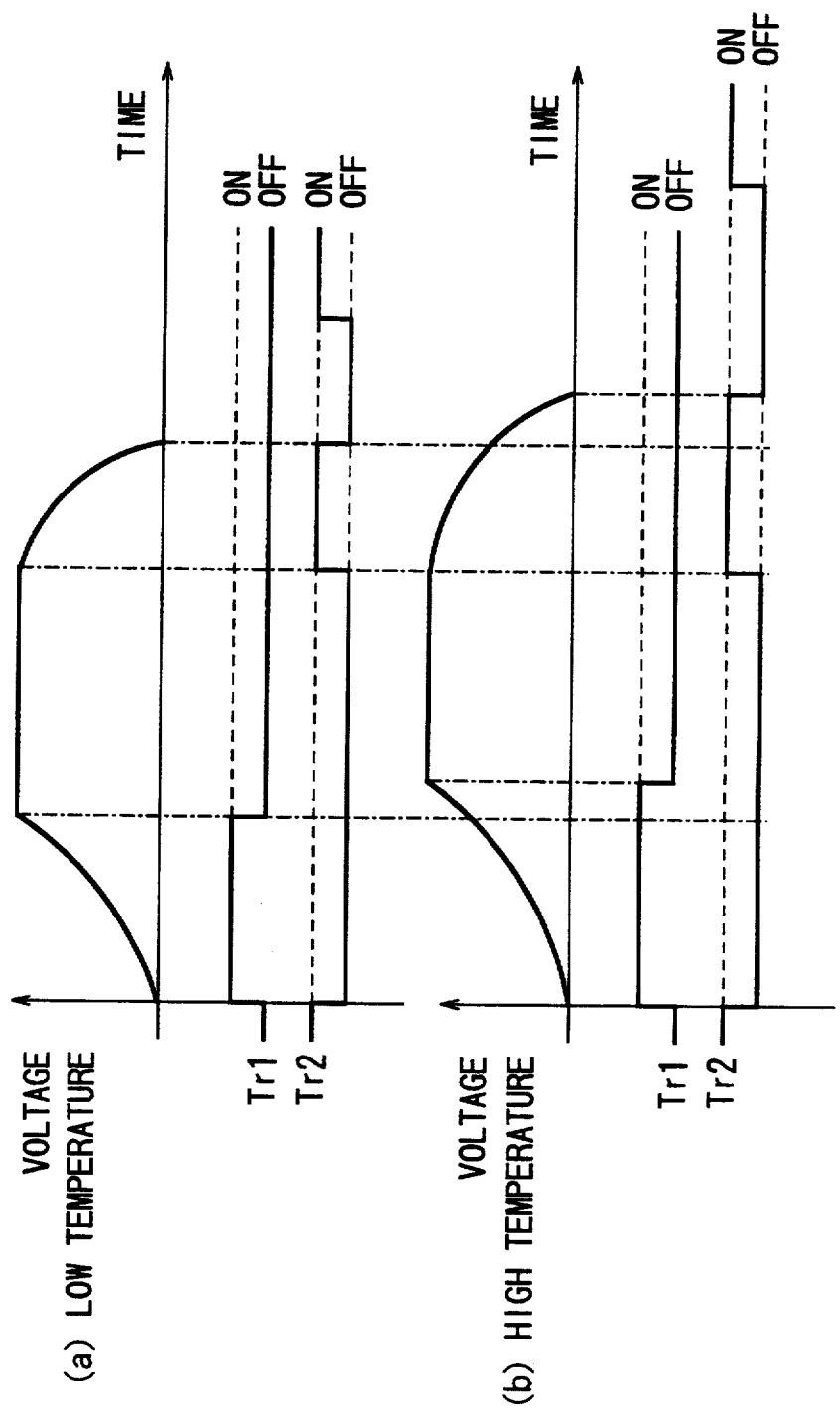

PIEZOELECTRIC ELEMENT DRIVING CIRCUIT

CROSS-REFERENCE TO RELATED APPLICATION

This is a Continuation of application Ser. No. 07/959,441 filed Oct. 13, 1992, now abandoned, which in turn is a Continuation in Part of application Ser. No. 02/728,592, filed Jul. 11, 1991, now abandoned.

BACKGROUND OF THE INVENTION

1. Field of the Invention

The present invention relates to a piezoelectric element driving circuit with which a driving duration of a piezoelectric element is controlled. More particularly, the invention relates to such a circuit which can attain low power consumption and stabilized operation.

2. Description of the Related Art

Piezoelectric elements have been employed to construct an actuator of a dot impact printer head. Japanese Laid-Open Patent Publication No. 2-119276 discloses a piezoelectric element driving circuit wherein the piezoelectric element and a capacitor are complementarily charged and discharged in response to switching actions of a switching element such as a transistor. The driving circuit achieves low power consumption and low heat generation by controlling both a timing and a duration at which a voltage is applied to the piezoelectric element.

In a circuit configured so that a piezoelectric element is applied with a voltage through a coil to charge the piezoelectric element, charging and discharging periods of time for the piezoelectric element are determined as a function of a product of an electrostatic capacitance c of the piezoelectric element and an inductance L of the coil, as disclosed in co-pending U.S. Application Ser. No. 07/728,592 filed Jul. 11, 1991. In the circuit arrangement disclosed therein, both the charging and discharging periods of time are less than $\pi\sqrt{LC}/2$. Given that the ON duration of a switching element is shorter than $\pi\sqrt{LC}/2$ but longer than $\pi\sqrt{LC}/3$, the piezoelectric element can be charged up to a target voltage due to energy retained in the coil. However, there is a problem that the voltage across the piezoelectric element does not reach the target voltage before expiration of $\pi\sqrt{LC}/2$, because the switching element is rendered OFF before the voltage across the piezoelectric element reaches a power source voltage. Such a time lag also occurs at the time of discharge of the piezoelectric element, wherein the switching element is rendered ON before the voltage across the piezoelectric element is zeroed. Longer periods of time are necessary to fully charge and discharge the piezoelectric element than the ON and OFF durations of the switching element that controls the charging and discharging of the piezoelectric element.

If the switching element is ON for more than $\pi\sqrt{LC}/2$, a current flows in a closed circuit comprised of a coil, transistor and a diode after the piezoelectric element has reached the target voltage. Since those elements have resistive components, heat is generated, causing energy on the coil to waste. Consequently, the energy that could have been recaptured by a power source after the transistor is rendered OFF cannot be entirely recaptured thereby. In view of the foregoing, it is desirable that the switching actions performed by the switching element for the purpose of charging and discharging the piezoelectric element be set to a duration exactly equal to $\pi\sqrt{LC}/2$.

However, if so set, the following problems arise. When a voltage is applied to the piezoelectric element, an electric field is developed between electrodes of the piezoelectric element, causing dielectrics having polarities to rotate. Due to the rotations of the dielectrics, the piezoelectric element extends or restores. Further, heat is generated when the piezoelectric element is extended or restored.

On the other hand, the dielectric constant of a piezoelectric element differs depending on a temperature, so that the electrostatic capacity of the piezoelectric element changes depending on the temperature. Due to the heat generated when the piezoelectric element is actuated, a period of time during which the switching element is rendered ON must be changed. This problem can be solved if the switching transistor is rendered OFF when it is detected that the voltage across the piezoelectric element reaches the target voltage. To this end, the printing head of a dot matrix printer having, for example, twenty-four pins must have the same number of voltage detection circuits in one-time correspondence with the piezoelectric elements coupled to the twenty-four pins. This causes increase of the cost of the printer.

SUMMARY OF THE INVENTION

The present invention has been made to solve the aforementioned problems, and accordingly it is an object of the invention to provide a piezoelectric element driving circuit which can set an optimum driving time of a piezoelectric element depending on the temperature of the piezoelectric element.

Another object of the invention is to provide a piezoelectric element driving circuit which is stably operable with respect to temperature change.

Yet another object of the invention is to provide a piezoelectric element delving circuit which can save power consumption.

To achieve the above and other objects, there is provided a driving circuit for driving a piezoelectric element which includes power supplying means, a coil, first switching means, second switching means, temperature sensing means, and control means. The coil has a first terminal connected to a first terminal of the piezoelectric element and a second terminal connected to the power supplying means. The first switching means is connected between the power supplying means and the second terminal of the coil. The first switching means is selectively rendered ON and OFF. The second switching means is connected between the second terminal of the coil and the second terminal of the piezoelectric element. The second switching means is also selectively rendered ON and OFF. The coil and the piezoelectric element form a resonance circuit when the second switching means is rendered ON. The temperature sensing means is provided to sense a temperature of the piezoelectric element and issues a temperature signal indicative of the sensed temperature. The control means is responsive to the temperature signal for controlling both the first and second switching means. The first switching means is rendered ON for a given period of time determined by the temperature signal to charge the piezoelectric element and the second switching means is thereafter rendered ON for the same given period of time to discharge the piezoelectric element.

There is further provided storage means for storing a table indicating a relationship between temperatures and ON durations of the first and second switching means. The control means refers to the table and selects an ON duration corresponding to the temperature sensed by the temperature sensing means. The ON duration thus selected is used as the given period of time. The control means includes time measuring means with which the given period of time is measured. The ON durations stored in the table are determined based on an inductance of the coil and an electrostatic capacitance of the piezoelectric element at the temperature sensed by the temperature sensing means. More specifically, the ON duration is $\pi \sqrt{LC}/2$ where L is the inductance of the coil and C is the capacitance of the piezoelectric element at the temperature sensed by the temperature sensing means.

BRIEF DESCRIPTION OF THE DRAWINGS

The particular features and advantages of the invention as well as other objects will become apparent from the following description taken in connection with the accompanying drawings, in which:

FIG. 4 is a waveform diagram for illustrating the operation of the embodiment of the present invention.

DETAILED DESCRIPTION OF THE PREFERRED EMBODIMENTS

Figure 2:
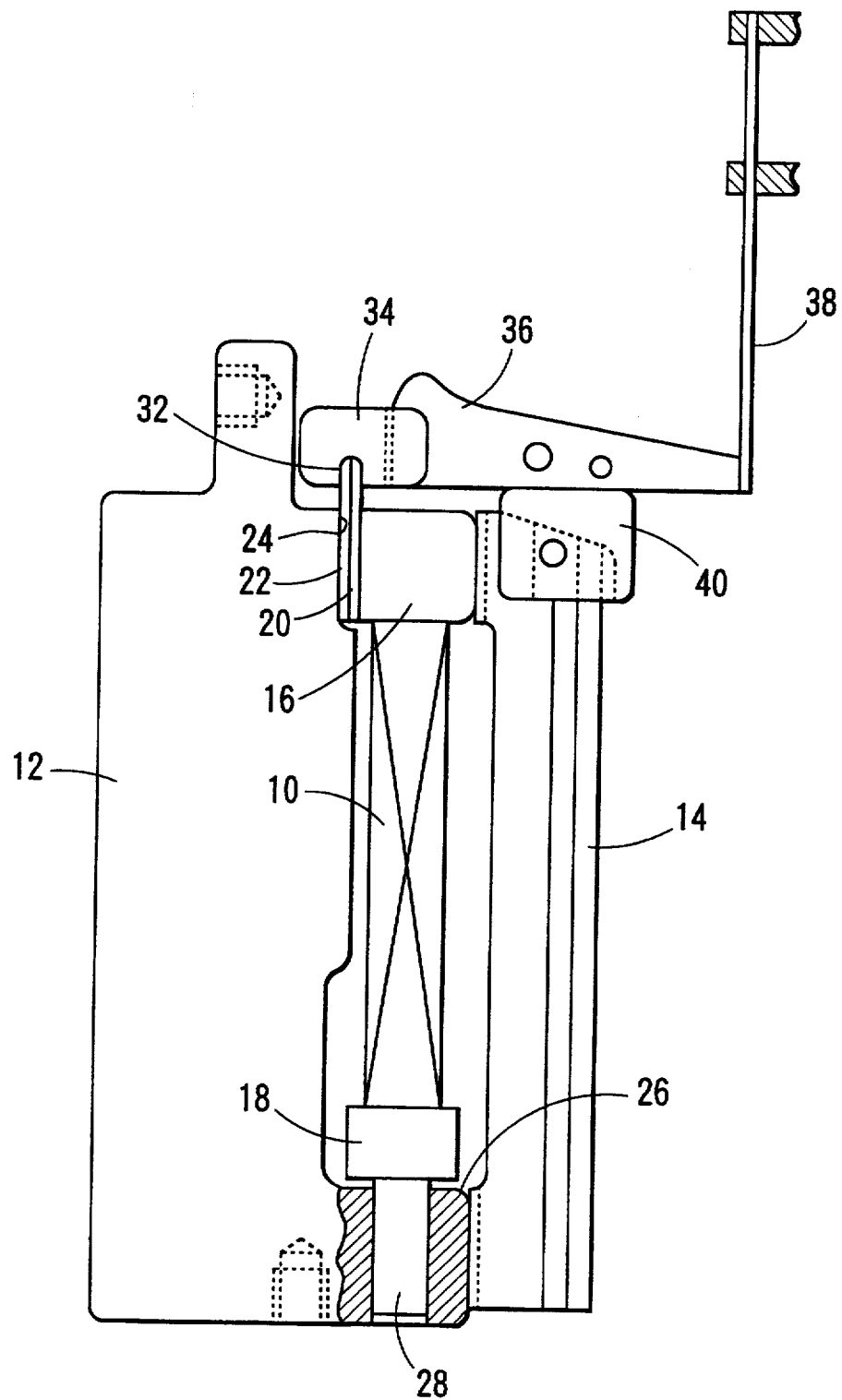
FIG. 2 is a front view showing a print element assembly of a dot impact printer driven by the driving circuit according to the embodiment of the present invention.

An embodiment of the present invention will now be described in detail with reference to the accompanying drawings. A piezoelectric element driving circuit to be described hereunder is used as an actuator in an impact dot matrix printer. The actuator includes a number of piezoelectric elements P stacked along a straight line. FIG. 2 shows an arrangement of a printing element of a dot matrix printer.

Referring to FIG. 2, the piezoelectric element 10 is supported by two frames 12, 14 extending in a direction parallel to the longitudinal direction of the piezoelectric element 10. The piezoelectric element 10 is connected to the lower end portion of the frame 12. The frame 14 is a platelike member and is made of a resiliently deformable material, The piezoelectric element 10 has two ends to which a movable element 16 and a temperature compensation block 18 are fixedly secured, respectively, both of Which are of rectangular parallelepiped shape. One side face of the movable element 16 is fixed to the frame 14 and the other side face thereof has a leaf spring attached thereto which spring is in contact with and slidably movable drive to another leaf spring 22 attached to the side face 24 of the frame 12. The rear face of the temperature compensation block 18 faces a surface 26 of the frame 12. A pin 28 is fixedly provided to the frame 12 and is in abutment with the temperature compensation block 18. The pin 28 urges the temperature compensation block is toward the movable element 16. The piezoelectric element 10 is secured to the frames 12, 14 while being imparted with a small compression force in the longitudinal direction. Therefore, if the piezoelectric element 10 extends in the longitudinal direction in response to a voltage applied thereto, the leaf spring 20 moves upward in the figure relative to the leaf spring 22. On the other hand, if the application of the voltage to the piezoelectric element 10 is ceased to restore the piezoelectric element 10, the leaf spring 20 moves downward.

The upper ends of the leaf springs 20, 22 are received in a groove 32 formed in a retaining member 34. The width of the groove 32 is larger than the sum of the thickness of the leaf springs 20, 22. The leaf springs 20, 22 are fixedly secured to the side walls of the groove 32. An arm 36 extends from the retaining member 34, to the tip end of which a print wire 38 is fixedly attached. The print wire 38 is disposed in confrontation with the print paper through an ink ribbon.

When the leaf spring 20 slidably moves upwardly relative to the leaf spring 22 attendant to the extension of the piezoelectric element 10, the retaining member 34 is rotated counter-clockwise about its center. The print wire 38 is impinged against the print paper through the ink ribbon, thereby making a dot impression on the print paper. When the piezoelectric element 10 is retracted from this state, the retaining member 34 is rotated clockwise, with the result that the print wire 38 returns to a non-operable position. The non-operable position of the print wire 38 is defined by a position where the arm 36 is brought into abutment with a stopper 40 made of a low repellent rubber.

As is apparent from the foregoing description, the piezoelectric actuator transmits an enlarged displacement of the piezoelectric element 10 to the print wire via the leaf springs 20, 22, the retaining member 34 and the arm 36.

When the print wire 38 is impinged against the print paper, a moment causing to rotate the movable member 16 in counterclockwise direction about its center is imparted to the movable member 16, so that the piezoelectric element 10 is liable to be bend. In this embodiment, however, the frame 14 is resiliently prolonged in accordance with the prolongation of the piezoelectric element 10 and therefore another moment is imparted to the movable member 16 causing to rotate it in the clockwise direction. As a result, the opposite directional two moments are canceled out each other and hence the piezoelectric element 10 is not bent but is allowed to linearly prolong or retract.

The temperature compensation block 18 is provided for the following reasons. Even if the voltage which has been applied to the piezoelectric element 10 is completely zeroed, there remains a positive directional residual distortion in the piezoelectric element 10. The higher is the temperature of the piezoelectric element 10, the smaller is this residual distortion. Therefore, the piezoelectric element, when fulled extended, does not reach the correct position when the temperature is high even if the voltage applied to the piezoelectric element 10 is controlled so as not to vary and to thus control the amount of displacement of the piezoelectric element 10 at constant. The higher the temperature is, the more does a distance between the correct position and the maximum displacement position increase. To eliminate the shortage of the displacement position, the temperature compensation block 18 is provided. The temperature compensation block 18 expands a greater extent as the temperature becomes higher. The temperature compensation block 18 is disposed in a position toward which the piezoelectric element 10 extends. Specifically, the temperature compensation block 18 is provided to compensate the shortage of displacement of the piezoelectric 10 with the expansion length of the temperature compensation block 18 so that the maximum displacement position of the piezoelectric element 10 does not vary depending upon the temperature change.

Figure 1:
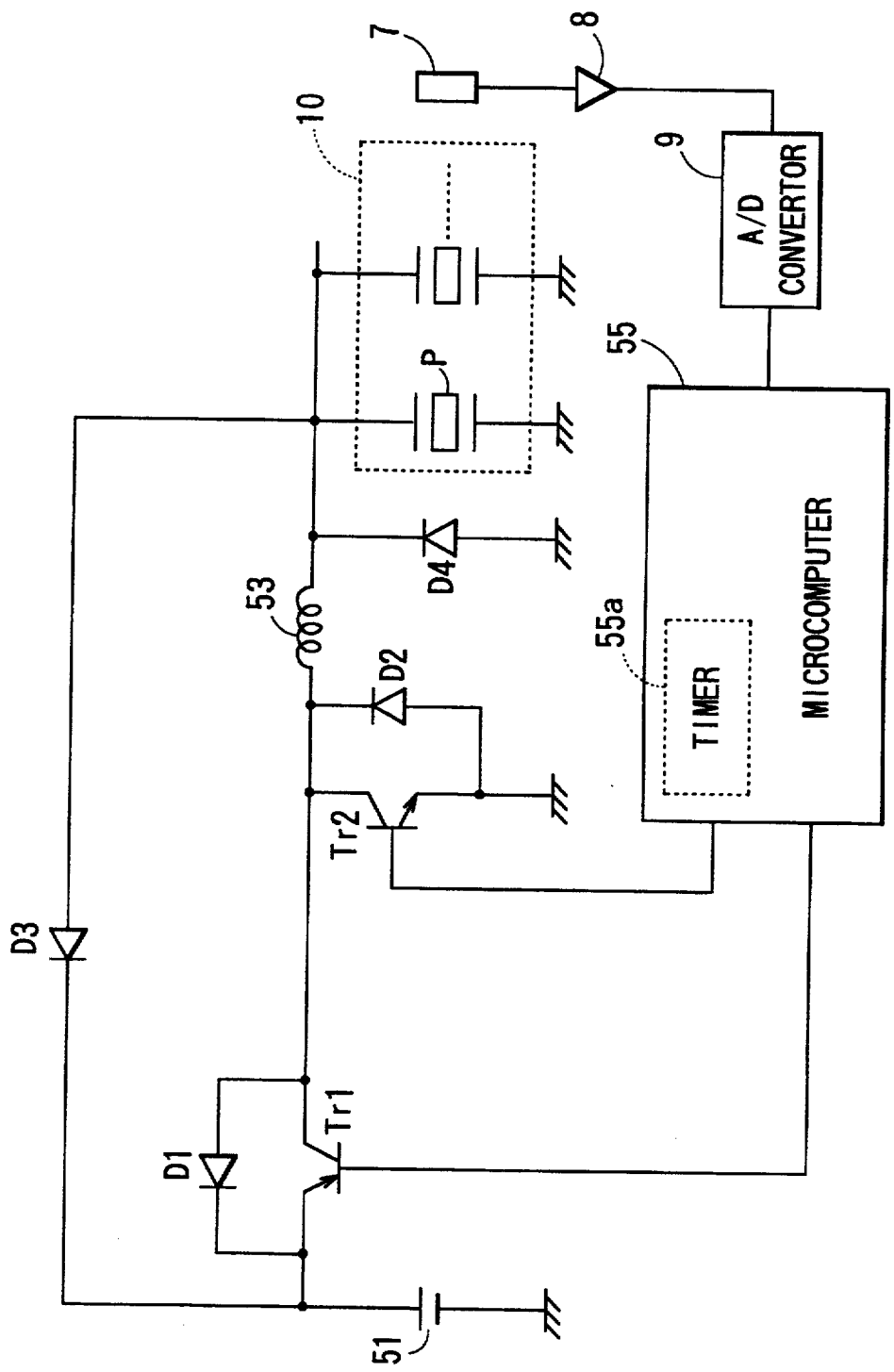
FIG. 1 is a circuit diagram showing an piezoelectric element driving circuit according to an embodiment of the present invention.

Referring to FIG. 1, a driving circuit of the piezoelectric element 10 will be described. In this embodiment, a D.C. power supply 51 which supplies a d.c. voltage, a transistor Tr1, a coil 53 and a piezoelectric element P are connected in series in the stated order. The negative electrodes of both the D.C. power supply 51 and the piezoelectric elements P are connected to ground. A plurality of thin piezoelectric elements P are connected in parallel to one another. The forward direction of the transistor Tr1 is a direction toward the positive electrode of the piezoelectric element P from the positive electrode of the D.C. power supply 51 (hereinafter this direction will be referred to as "forward direction of the circuit").

The connection between the transistor Tr1 and the coil 53 is grounded through a transistor Tr2. The forward direction of the transistor Tr2 is a direction toward ground from the connection between the transistor Tr1 and the coil 53. Diodes D1 and D2 are connected in parallel to the transistors Tr1 and Tr2, respectively. The forward direction of each of the diodes D1, D2 is reverse to the forward direction of the associated transistor. The positive electrodes of both the D.C. power supply 81 and the piezoelectric elements P are connected via a diode D3. The forward direction of the diode D3 is reverse to the forward direction of the circuit. A diode D4 is connected in parallel to the piezoelectric elements P. The forward direction of the diode D4 is a direction toward the positive electrode of the piezoelectric element P from the negative electrode thereof.

Switching between ON and OFF of each of the transistors Tr1 and Tr2 is effected under the aegis of a transistor control circuit (hereinafter referred simply to as "control circuit 55"). The control circuit 55 also governs the entire operations of the impact printer and is comprised of one-chip microcomputer. The control circuit 55 incorporates a timer 55 in the interior thereof.

A temperature sensor 7 is provided in the print head for sensing the temperature of the piezoelectric element P. The output from the sensor 7 is amplified in an amplifier 8 and is then subjected to analog-to-digital conversion by an analog-to-digital (A/D) converter 9. The output of the A/D converter 9 is input to the control circuit 55. The combination of the temperature sensor 7, the amplifier 8 and the A/D converter 9 is used commonly to twenty-four piezoelectric elements. Note that head of the dot matrix printer includes twenty-four pins. The temperature sensor 7 is disposed inside a heat radiation silicon which is provided for surrounding the piezoelectric elements P. The location of the temperature sensor 7 must be substantially at equidistant from each of the piezoelectric elements.

The microcomputer has a read-only memory (ROM) and a table is stored therein. In the table, there is written a relationship between temperatures and ON durations of both the transistors Tr1 and Tr2. To construct the table, the A/D converted digital values of the temperature signal to be, issued from the temperature sensor 7 are used as index values and electrostatic capacitances C(I) of the piezoelectric element at temperatures corresponding to the index values (i) are obtained. It is desirable that the electrostatic capacitances of the piezoelectric element be measured under the same circumstance where the piezoelectric element is mounted on the printer head. Computation of $\pi$ times the square root of LC and dividing the product by two, i.e., $\pi\sqrt{LC}/2$, is performed to obtain the values of Ton(i), where L is an inductance of the coil 53 and C is an electrostatic capacitance of the piezoelectric element. The thus computed values of Ton(i) are stored in the table in relation to the index values. The values of Ton(i) may alternatively be obtained by measuring discharging periods of time at which the fully charged piezoelectric element is discharged. In this case, the same coil as provided in the circuit is used under the same circumstance. The discharging periods of time thus measured are converted to values that can be used in steps 110 and 122 to be described later on with reference to the flow chart.

Figure 3:
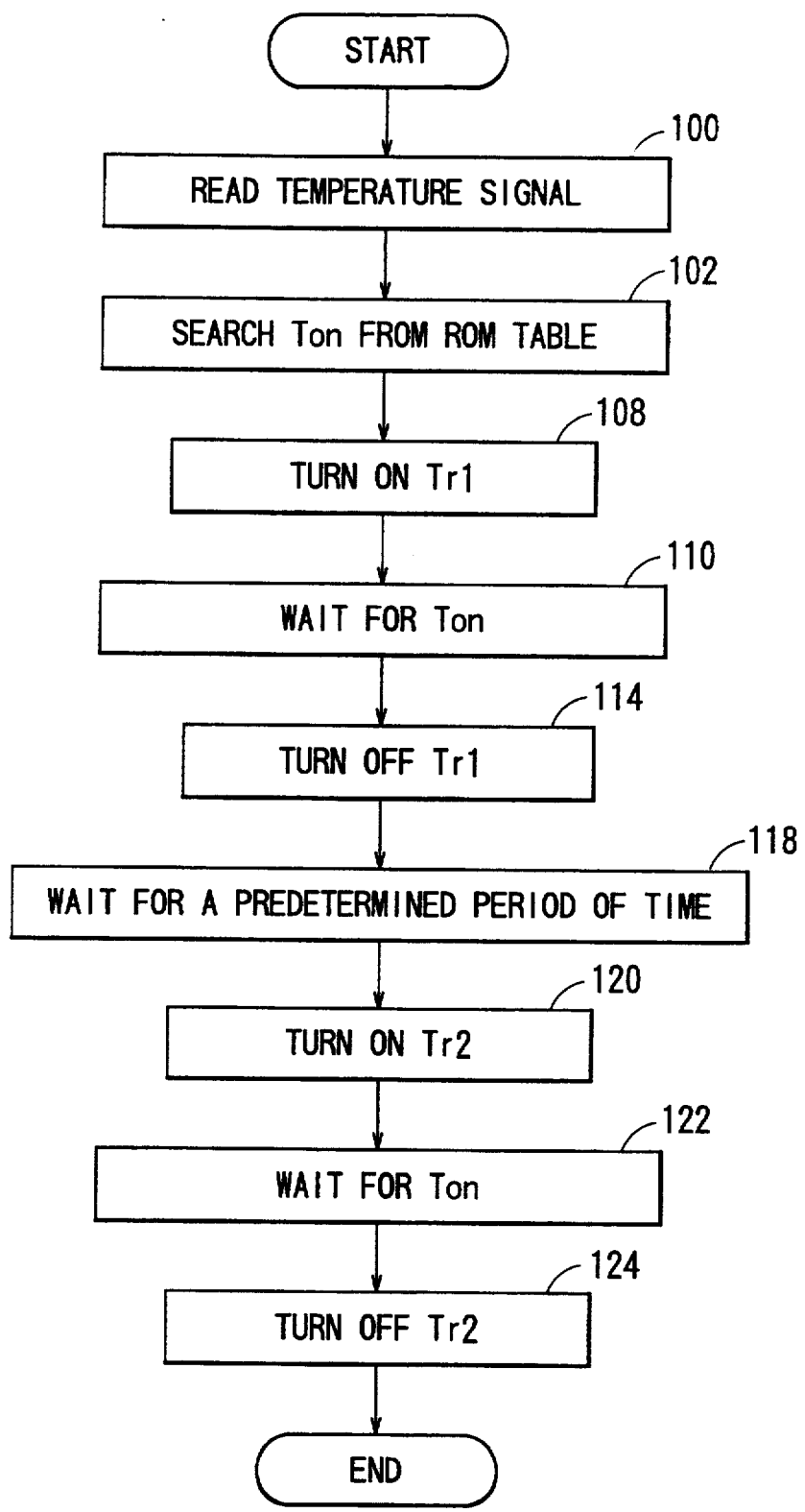
FIG. 3 is a flow chart illustrating control sequence executed by a control circuit of the embodiment of the present invention.

Operation of the circuit will be described with reference to a flow chart illustrated in FIG. 3.

In step 100, the control circuit 55 reads a temperature signal supplied from a temperature sensor 7 through the A/D converter 9. The temperature signal thus read is universal to all of the piezoelectric elements which make up the actuator. In step 102, a search is performed to find the ON-duration Ton of the transistor Tr1 corresponding to the sensed temperature from the table stored in the ROM. In step 108, the control circuit 55 applies a high level voltage to the base of the transistor Tr1 to render it ON and waits for the period of time Ton in step 110. Through the processing in steps 108 and 110, the transistor Tr1 is rendered ON for the period of time Ton. A current flows in the piezoelectric element P through the transistor Tr1 and the coil 53. The piezoelectric element P is charged while being resonated with the coil 53 and the piezoelectric element P is extended to thus make a dot impression on a printing medium such as a print paper.

When the voltage across the piezoelectric element P becomes substantially equal to the power source voltage of the D.C. power source 51, i.e., when the specified ON duration Ton has expired, the control circuit 55 renders the transistor Tr1 OFF in step 114. In step 118, a waiting time of a predetermined period of time is reserved to perfect printing. Even if the voltage across the piezoelectric element has reached the power source voltage before the expiration of the time Ton due to variation in characteristic of the piezoelectric element, the current flowing through the coil 53 is maintained unchanged because the current continuously flows in a closed loop including the coil 53, the diode D3 and the transistor Tr1 due to the interaction of the coil 53. In this condition, energy on the coil 53 is fed back to the D.C. power source 51 through the closed circuit including coil 53, diode D3, D.C. power source 51 and diode D2. When the transistor Tr1 is being held in OFF, the voltage across the piezoelectric element lowers as the electric energy stored therein is wasted. In step 120, the control circuit 55 applies a high level voltage to the base of the transistor Tr2 to render it ON and waits for the time Ton in step 122. As a result, the electric charges in the piezoelectric element P are discharged and thus the extended piezoelectric element P is retracted to the original position. Thereafter, the transistor Tr2 is rendered OFF in step 124. With the above-described series of processings, one impact printing operation is finished. It is to be noted that the transistor Tr2 may again be rendered conductive after the transistor Tr2 is OFF as described in the co-pending application Ser. No.

07/728,592. The disclosure of the co-pending application is incorporated herein by reference.

FIG. 4 shows time charts indicating ON and OFF timings of both the transistors Tr1 and Tr2 in relation to the voltage across the piezoelectric element P when the above-described processings executed. FIG. 4 includes two time charts, one in the case of low temperature and the other in the case of high temperature. Since the electrostatic capacitance C of the piezoelectric element is larger in the case of high temperature than in the case of low temperature, the duty of ON duration of each of the transistors Tr1 and Tr2 are prolonged in the high temperature circumstance compared with the low temperature circumstance.

The base of transistor Tr1 is applied with a voltage lower than the power source voltage when the transistor Tr1 is ON and with the same voltage as the power source voltage when the transistor Tr1 is OFF. While in this embodiment, twenty-four Piezoelectric elements which are covered with the heat radiating silicon are presumed to be at the same temperature, there may be temperature variations in the individual piezoelectric elements. As a modification, a temperature sensor may be provided in proximity with each of the piezoelectric element to achieve high accuracy driving.

While only one exemplary embodiment of this invention has been described in detail, those skilled in the art will recognize that there are many possible modifications and variations which may be made in this exemplary embodiment while yet retaining many of the novel features and advantages of the invention. Accordingly, all such modifications and variations are intended to be included within the scope of the appended claims. For example, while the temperature sensor 7 is employed to measure the temperature of the piezoelectric element P in the above-described embodiment, the ON duration Ton can be controlled in 8 manner as described in Japanese Laid-Open Patent Publication No. 61-112649. According to this publication, the temperature of the print head can be determined by an arrangement which comprises counter means for sequentially adding dot numbers to be printed in printing operation, time measuring means for measuring a predetermined period of time, and subtracting means for subtracting a predetermined value from a count value of the counter means each time when the measurement of the predetermined period of time is performed. Further, as disclosed in Japanese Laid-Open Utility Model Publication No. 2-68134, the temperature of the piezoelectric element P can be sensed by measuring a current flowing in a resistor connected in series to the piezoelectric element. The optimum duration of Ton can be obtained from the current flowing therein.

The charging and discharging durations may not necessarily be equal to each other but be unequal if so determined by a circuit configuration. For example, if two coils are selectively used depending on charging and discharging, the charging and discharging durations may not be equal to each other.

What is claimed is:

1. A driving circuit for driving a piezoelectric element having a first terminal and a second terminal, comprising:

power supplying means for supplying a constant level D.C. voltage to said piezoelectric element;

a coil having a first terminal connected to the first terminal of said piezoelectric element;

first switching means connected between said power supplying means and a second terminal of said coil, said first switching means being selectively rendered ON and OFF once during a single printing operation of the piezoelectric element;

second switching means connected between the second terminal of said coil and the second terminal of said piezoelectric element, said second switching means being selectively rendered ON and OFF once during the single printing operation, said coil and said piezoelectric element forming a resonance circuit when said second switching means is rendered ON, said resonance circuit having a resonance frequency based on an inductance of said coil and an electrostatic capacitance of said piezoelectric element;

temperature sensing means for sensing a temperature of said piezoelectric element and for generating a temperature signal indicative of the sensed temperature; and control means for switching each of the first and second switching means ON and OFF at most once during the single printing operation of the piezoelectric element and for determining, in response to the temperature of the piezoelectric element, a time period for compensating for the temperature-dependent change in the electrostatic capacitance of the piezoelectric element, the control means controlling the driving circuit during the single printing operation by switching said first switching means ON for the time period to charge said piezoelectric element, switching said first switching means off for a predetermined time period, thereafter switching said second switching means ON for the time period to discharge, said piezoelectric element and switching second switching means off.

2. The driving circuit according to claim 1, further comprising storage means for storing a table indicating a relationship between temperatures and ON durations of said first and second switching means, and wherein said control means refers to the table and selects an ON duration corresponding to the temperature sensed by said temperature sensing means, the ON duration thus selected being used as the given period of time.

3. The driving circuit according to claim 2, wherein said control means includes time measuring means for measuring the given period of time.

4. The driving circuit according to claim 1, wherein the given period of time is determined based on the inductance of said coil and the electrostatic capacitance of said piezoelectric element at the temperature sensed by said temperature sensing means.

5. The driving circuit according to claim 4, wherein the given period of time $\pi\sqrt{LC}/2$ where L is the inductance of said coil and C is the electrostatic capacitance of said piezoelectric element at the temperature sensed by said temperature sensing means.

6. The driving circuit according to claim 5, further comprising storage means for storing a table indicating a relationship between temperatures and ON durations of said first and second switching means, and wherein said control means refers to the table and selects an ON duration corresponding to the temperature sensed by said temperature sensing means, the ON duration thus selected being used as the given period of time.

7. The driving circuit according to claim 6, wherein said control means includes time measuring means for measuring the given period of time 8. The driving circuit according to claim 1, further comprising connecting means for connecting the second terminal of said coil to said power supplying means.

9. The driving circuit according to claim 1, wherein said control means further controls said second switching means to again render ON after said second switching means once rendered OFF.

10. The driving circuit according to claim 1, further comprising a closed loop including said coil and said first switching means for allowing a current to continuously flow in said coil until said first switching means is rendered OFF.

11. The driving circuit according to claim 10, wherein said closed loop further includes said power supplying means and a diode connected between the first terminal of said coil and said power supplying means.

12. A driving circuit for driving a piezoelectric element having a first terminal and a second terminal, comprising:
    power supplying means for supplying a constant level D.C. voltage to said piezoelectric element;
    a coil having a first terminal and a second terminal, the first terminal of said coil connected to the first terminal of said piezoelectric element;
    temperature sensing means for sensing a temperature of said piezoelectric element and for generating a temperature signal indicative of the sensed temperature;
    first switching means connected between said power supplying means and the second terminal of said coil for charging said piezoelectric element for a first period of time based on the temperature signal;
    second switching means connected between the second terminal of said coil and the second terminal of said piezoelectric element, said second switching means discharging said piezoelectric element during a second period of time after said first switching means has finished charging the piezoelectric element, the second period of time being substantially equal to the first period of time; and
    control means responsive to the temperature signal for controlling both said first and second switching means during the single printing operation such that a change of the resonance frequency of said resonance circuit caused by a temperature-dependent change in the electrostatic capacitance of said piezoelectric element is compensated for by rendering said first switching means ON at most once for the first period of time during a single printing operation, and after rendering the first switching means OFF, said control means rendering said second switching means ON at most once for the second period of time.

13. A driving circuit for driving a piezoelectric element having first and second terminals, comprising:
    power supplying means;
    a coil having a first terminal connected to the first terminal of said piezoelectric element;
    first switching means connected between said power supplying means and a second terminal of said coil, said first switching means being selectively rendered ON and OFF;
    second switching means connected between the second terminal of said coil and the second terminal of said piezoelectric element, said second switching means being selectively rendered ON and OFF, said coil and said piezoelectric element forming a resonance circuit when said second switching means is rendered ON;
    temperature sensing means for sensing a temperature of said piezoelectric element;
    storage means for storing a table indicating a relationship between temperatures of said piezoelectric element and ON durations of said first and second switching means; and
    control means for controlling both said first and second switching means based on the temperature sensed by said temperature sensing means, said control means selecting from the table a specific ON duration based on the temperature sensed by said temperature sensing means, and rendering said first switching means ON for the specific ON duration to charge said piezoelectric element, and thereafter, rendering said second switching means ON for the specific ON duration to discharge said piezoelectric element, said control means having a time measuring means to measure the specific ON duration.

14. The driving circuit according to claim 13, wherein the ON durations of the first switching means and said second switching means are determined based on an inductance of said coil and a capacitance of said piezoelectric element at the temperature sensed by said temperature sensing means.

15. The driving circuit according to claim 14, wherein the ON duration is given by $\pi\sqrt{LC}/2$, where L is the inductance of said coil and C is the capacitance of said piezoelectric element at the temperature sensed by said temperature sensing means.

16. The driving circuit according to claim 13, further comprising connecting means for connecting the second terminal of said coil to said power supplying means.

17. The driving circuit according to claim 13, wherein said control means further controls said second switching means to again render ON after said second switching means is rendered OFF.

18. The driving circuit according to claim 13, further comprising a closed loop including said coil and said first switching means for allowing a current to continuously flow in said coil until said first switching means is rendered OFF.

19. The driving circuit according to claim 18, wherein said closed loop further includes said power supplying means and a diode connected between the first terminal of said coil and said power supplying means.

20. The driving circuit according to claim 12, wherein said power supply means supplies a constant level DC voltage to said piezoelectric element.

* * * * *